April 8, 1947.  A. C. ARBOGAST  2,418,447
VALVE
Filed Jan. 5, 1944
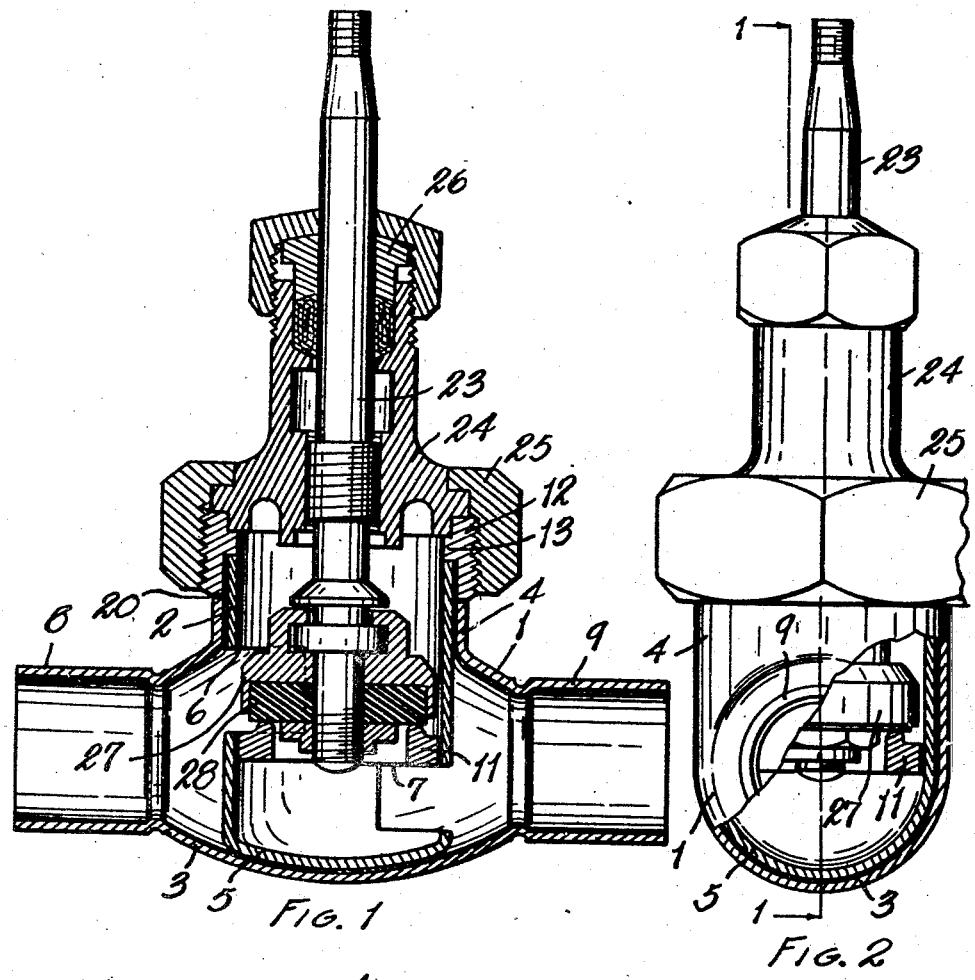
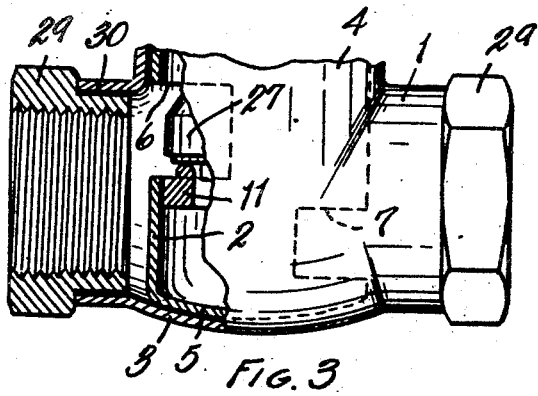
INVENTOR.
ALFRED C. ARBOGAST
BY
Earl D. Chappell

UNITED STATES PATENT OFFICE 2,418,447

VALVE

Alfred C. Arbogast, Elkhart, Ind., assignor to Northern Indiana Brass Company, Elkhart, Ind.

Application January 5, 1944, Serial No. 517,034

14 Claims. (Cl. 251—156)

This invention relates to improvements in valves.

The main objects of this invention are:

First, to provide a valve structure which is suitable for use in systems involving the handling of various fluids including gases such, for example, as refrigerant gases.

Second, to provide a valve the main portion of which is formed of wrought metal parts assembled in a manner to provide a gas-tight structure.

Third, to provide a structure having these advantages in which the parts are so arranged that they may be very effectively assembled in mass production by relatively unskilled workmen with uniformly satisfactory results in the finished product.

Objects pertaining to details and economies of construction and operation will appear from the description to follow. The invention is defined in the claims.

A structure embodying the features of the invention is illustrated in the accompanying drawing, in which:

Fig. 1 is a view mainly in vertical section taken on line 1—1 of Fig. 2, of a valve structure embodying the invention, the stem being shown in full lines for the purpose of clarity.

Fig. 2 is an end elevation partially in transverse section.

Fig. 3 is a fragmentary view partially in longitudinal section.

In the accompanying drawing I have not attempted to illustrate the proper clearances or tolerances between the parts constituting the structure. In fact, they are greatly enlarged. For example, the fit between certain parts is such as to provide a capillary space between them or a space which will result in capillary flow of the brazing material or soldering material. It is impractical to attempt to illustrate such space, but the flow of solder by capillary attraction in suitable spaces is known and understood by those skilled in the art. Further, while for convenience I mainly use the term "brazed" in this application, it is to be understood that it is used in its broader sense, and that the terms soldering and speltering, and soldered and speltered, are frequently used as synonymous for brazing and brazed.

In the accompanying drawing I illustrate a practical embodiment of the invention.

Referring to the drawing, 1 designates a T-shaped tubular outer body member which in the preferred form of the invention is formed of wrought metal. Where copper or brass fittings are desired, this member may be desirably produced by cold working a drawn tube of copper or suitable copper alloy in accordance with the steps disclosed in the patent to Seeber et al., No. 2,111,695, issued March 22, 1938, or the patent to Parker, No. 2,027,285, issued January 7, 1936. The tubular inner body member 2 is also preferably of wrought metal drawn or formed from suitable material. These wrought metal parts or parts formed as indicated are highly desirable in that they are not porous as is the ordinary valve body casting which permits the leakage or escape of gases and even certain liquids therethrough. For many requirements, for example, the handling of refrigerating gases and, in fact, in the manufacture and handling of gases generally, the escape of any quantity of gas is highly objectionable.

In the embodiment illustrated the outer body member 1 is formed with an inwardly concave wall 3 opposite the lateral tubular extension or branch 4 thereof. The extension 4 is desirably cylindrical. The inner body member 2 is of such diameter that when inserted into the body member 1 transversely thereof it is supported concentrically of the lateral arm 4 and in such relationship to the concentric walls thereof as to provide a capillary space. The inner member 2 is provided with an end wall 5 at its inner end, this end wall being convexly curved to correspond to the curvature of the opposed portion of the wall 3 of the outer body member. It will be noted that when assembled the inner body member projects substantially from the arm 4 of the outer body member. The inner body member has axially spaced fluid openings 6 and 7 in opposite sides thereof, the opening 6 being in communication with the longitudinal arm 8, while the opening 7 is in communication with the longitudinal arm 9. The side walls 10 of the outer body member 1 are so conformed and the parts are of such dimension that a capillary space is provided between the adjacent surfaces, and extending longitudinally of the inner body member from the annular capillary space between the arm 4 and the inner body member to the bottom of the inner body member.

The valve seat member 11 is disposed within the inner body member intermediate the fluid openings 6 and 7 thereof. This member is of such fit in the inner body member that it is supported when assembled; that is, it has what is mechanically known as a location fit, which supports it in place during the soldering or brazing operation and provides a suitable annular capillary space between the valve seat member and the surrounding wall.

The adapter 12, which in this embodiment is externally threaded for purposes to be pointed out, is of such dimension and internal diameter as to embrace the projecting end of the inner body member, being internally shouldered at 13 to engage the end of the inner body member. These parts are of such fit as to provide an annular capillary space between them, which in effect is a continuation of the annular capillary space between the inner body member and the arm 4 of the outer body member previously described. The inner end of this adapter member 12 is opposed to the end of the outer body member.

In the embodiment illustrated the valve stem 23 is threaded into the fixture 24 which is secured upon the adapter 12 by means of the annular clamping member 25. The stem is provided with suitable packing and packing glands designated generally by the numeral 26. The valve 27 is rotatably mounted on the stem and has a resilient facing 28 coacting with the valve seat. These valve parts, however, may be greatly varied. The primary feature of my invention resides in the valve casing structure described.

In the embodiment shown in Fig. 3, internally threaded adapters 29 are provided for the longitudinal arms of the outer valve casing member, these adapters being secured within the longitudinal arms of the outer valve casing member by soldering or brazing, as indicated at 30.

While I have illustrated only one form of valve, it will be understood that my invention is capable of adaptation to many types of structures such as angle valves, gate valves, check valves and other forms. I have illustrated and described the invention in a highly successful and practical embodiment thereof. I have not attempted to illustrate and describe other embodiments or adaptations of the invention as it is believed this disclosure will enable those skilled in the art to embody or adapt the invention as desired. As stated, no attempt has been made to illustrate clearances and tolerances, as this is not considered practical, but the relationship of the parts has been clearly pointed out.

Having thus described my invention, what I claim as new and desire to secure by Letters Patent is:

1. In a valve, the combination of a casing comprising a T-shaped wrought metal outer body member, a tubular wrought metal inner body member disposed transversely within the outer body member and concentrically relative to the lateral arm thereof to project therefrom, said outer body member having an internally concaved side wall opposed to its said lateral arm, said inner body member having an end wall convexedly curved to correspond to said concaved wall of said outer body member and spaced therefrom to provide a capillary space between them, said walls being brazed together within said space, said inner body member having fluid openings in its opposite sides arranged in axially spaced planes with one opening in communication with each longitudinal arm of said outer body member, portions of the opposed sides of said inner body member between its said fluid openings being spaced relative to adjacent side surfaces of said outer body member to provide capillary spaces, the body member walls being brazed together within such spaces, and an adapter collar embracing the projecting portion of said inner body member and having an internal shoulder abutting the end thereof, the concentric wall portions of said inner body member and the lateral arm of said outer body member being spaced to provide capillary space between them and the concentric portion of said collar and the projecting end of said inner body member being spaced to provide a capillary space between them, said concentric parts being brazed together within said spaces, the adjacent edges of the lateral arm of said outer body member and collar being brazed together.

2. In a valve, the combination of a casing comprising a T-shaped non-ferrous wrought metal outer body member, a tubular non-ferrous wrought metal inner body member disposed transversely within the outer body member and concentrically relative to the lateral arm thereof to project therefrom, said outer body member having an internally concaved side wall opposed to its said lateral arm, said inner body member having an end wall convexedly curved to correspond to said concaved wall of said outer body member and spaced therefrom to provide a capillary space between them, said walls being brazed together within said space, said inner body member having fluid openings in its opposite sides arranged in axially spaced planes with one opening in communication with each longitudinal arm of said outer body member, portions of the opposed sides of said inner body member between its said fluid openings being spaced relative to adjacent side surfaces of said outer body member to provide capillary spaces, the body member walls being brazed together within such spaces, the concentric wall portions of said inner body member and the lateral arm of said outer body member being spaced to provide capillary space between them and being brazed together within such space.

3. In a valve, the combination of a casing comprising a T-shaped non-ferrous wrought metal outer body member, a tubular non-ferrous wrought metal inner body member disposed transversely within the outer body member and concentrically relative to the lateral arm thereof to project therefrom, said outer body member having an internally concaved side wall opposed to its said lateral arm, said inner body member having an end wall convexedly curved to correspond to said concaved wall of said outer body member and spaced therefrom to provide a capillary space between them, said walls being brazed together within said space, said inner body member having fluid openings in its opposite sides arranged in axially spaced planes with one opening in communication with each longitudinal arm of said outer body member, portions of the opposed sides of said inner body member between its said fluid openings being spaced relative to adjacent side surfaces of said outer body member to provide capillary spaces, the body member walls being brazed together within such spaces, and an annular valve seat member arranged concentrically within said inner body member axially intermediate its said fluid openings and peripherally spaced from the wall thereof to provide an annular capillary space between them and being brazed together within such space, the concentric wall portions of said inner body member and the lateral arm of said outer body member being spaced to provide capillary space between them and being brazed together within such space.

4. In a valve, the combination of a casing comprising a T-shaped wrought metal outer body member, a tubular wrought metal inner body member disposed transversely within the outer body member and concentrically relative to the lateral arm thereof to project therefrom and brazed thereto, said inner body member having fluid openings in its opposite sides arranged in axially spaced planes with one opening in communication with each longitudinal arm of said outer body member, the opposed sides of said inner body member between its said fluid openings and the adjacent wall surfaces of said outer body member being brazed together, and an adapter collar embracing the projecting portion of said inner body member and brazed thereto.

5. In a valve, the combination of a casing comprising a T-shaped wrought metal outer body member, and a tubular wrought metal inner body member disposed transversely within the outer body member and concentrically relative to the lateral arm thereof to project therefrom and brazed thereto, said inner body member having fluid openings in its opposite sides arranged in axially spaced planes with one opening in communication with each longitudinal arm of said outer body member, the opposed sides of said inner body member between its said fluid openings and the adjacent wall surfaces of said outer body being brazed together.

6. In a valve, the combination of a casing comprising a T-shaped wrought metal outer body member, a tubular wrought metal inner body member disposed transversely within the outer body member and concentrically relative to the lateral arm thereof to project therefrom and brazed thereto, said inner body member having fluid openings in its opposite sides arranged in axially spaced planes with one opening in communication with each longitudinal arm of said outer body member, the opposed sides of said inner body member between its said fluid openings and the adjacent wall surfaces of said outer body member being brazed together, and an annular valve seat member arranged concentrically within said inner body member axially intermediate its said fluid openings and brazed to the surrounding wall thereof.

7. In a valve, the combination of a casing comprising a T-shaped wrought metal outer body member, a tubular wrought metal inner body member disposed transversely within the outer body member and concentrically relative to the lateral arm thereof to project therefrom and brazed thereto, said inner body member having an end wall brazed to the adjacent side wall portion of the outer body member, said inner body member having fluid openings in its opposite sides arranged in axially spaced planes with one opening in communication with each longitudinal arm of said outer body member, the opposed sides of said inner body member between its said fluid openings and the adjacent wall surfaces of said outer body member being brazed together, and an annular valve seat member arranged concentrically within said inner body member axially intermediate its said fluid openings and brazed to the surrounding wall thereof.

8. In a valve, the combination of a tubular outer body member having a tubular lateral extension, a tubular inner body member disposed concentrically within said lateral extension of said outer body member to project therefrom and extending into the outer body member transversely thereof, said inner body member being brazed within said lateral extension throughout the periphery thereof and having an end wall disposed adjacent the side wall of the outer body member opposite to said lateral extension thereof and brazed thereto to provide a sealed joint therebetween, said inner body member having oppositely disposed axially spaced fluid openings each opening to an end of said outer body member, the sides of said inner body member between its said fluid openings being brazed to the adjacent sides of said outer body member to provide a sealed joint therebetween, said axially spaced fluid openings of said inner body member being axially spaced to receive a valve seat between them, and an adapter surrounding the projecting end of the inner body member and brazed thereto.

9. In a valve, the combination of a tubular outer body member having a tubular lateral extension, and a tubular inner body member disposed concentrically within said lateral extension of said outer body member and extending into the outer body member transversely thereof, said inner body member being brazed within said lateral extension throughout the periphery thereof and having an end wall disposed adjacent the side wall of the outer body member opposite to said lateral extension thereof and brazed thereto to provide a sealed joint therebetween, said inner body member having oppositely disposed axially spaced fluid openings each opening to an end of said outer body member, the sides of said inner body member between its said fluid openings being brazed to the adjacent sides of said outer body member to provide a sealed joint therebetween, said axially spaced fluid openings of said inner body member being axially spaced to receive a valve seat between them.

10. In a valve, the combination of a tubular outer body member having a tubular lateral extension, a tubular inner body member disposed concentrically within said lateral extension of said outer body member to project therefrom and extending into the outer body member transversely thereof, said inner body member being brazed within said lateral extension throughout the periphery thereof, said inner body member having oppositely disposed axially spaced fluid openings each opening to an end of said outer body member, the sides of said inner body member between its said fluid openings being brazed to the adjacent sides of said outer body member to provide a sealed joint therebetween, said axially spaced fluid openings of said inner body member being axially spaced to receive a valve seat between them, and an adapter surrounding the projecting end of the inner body member and brazed thereto.

11. In a valve, the combination of a tubular outer body member having a tubular lateral extension, a tubular inner body member disposed concentrically within said lateral extension of said outer body member and brazed thereto to provide a sealed joint therebetween and extending transversely within said inner body member, said inner body member having oppositely disposed axially spaced fluid openings each opening to an end of said outer body member, the sides of said inner body member between its said fluid openings being brazed to the adjacent sides of said outer body member to provide a sealed joint therebetween, and a valve seat member arranged concentrically within said inner body member axially intermediate its said fluid openings and peripherally brazed to said inner body member.

12. In a valve, the combination of a tubular outer body member having a tubular lateral extension, a tubular inner body member disposed concentrically within said lateral extension of said outer body member and extending into the outer body member transversely thereof, said inner body member having oppositely disposed axially spaced fluid openings each opening to an end of said outer body member, the sides of said inner body member between its said fluid openings being brazed to the adjacent sides of said outer body member to provide a sealed joint therebetween, said axially spaced fluid openings of said inner body member being axially spaced to receive a valve seat between them, and a valve seat member arranged within said inner body member between the said fluid openings and peripherally brazed to said inner body member.

13. In a valve, the combination of a tubular outer body member having a tubular lateral extension, a tubular inner body member disposed concentrically within said lateral extension of said outer body member to project therefrom and extending into the outer body member transversely thereof, said inner body member having oppositely disposed axially spaced fluid openings each opening to an end of said outer body member, the sides of said inner body member between its said fluid openings being brazed to the adjacent sides of said outer body member to provide a sealed joint therebetween, and an adapter surrounding the projecting end of the inner body member and brazed thereto.

14. In a valve, the combination of a tubular outer body member having a tubular lateral extension, a tubular inner body member disposed concentrically within said lateral extension of said outer body member and extending into the outer body member transversely thereof, said inner body member having oppositely disposed axially spaced fluid openings each opening to an end of said outer body member, the sides of said inner body member between its said fluid openings being brazed to the adjacent sides of said outer body member to provide a sealed joint therebetween, said axially spaced fluid openings of said inner body member being axially spaced to receive a valve seat between them, and a valve seat member arranged within said inner body member between the said fluid openings and peripherally brazed to said inner body member.

ALFRED C. ARBOGAST.

REFERENCES CITED

The following references are of record in the file of this patent:

UNITED STATES PATENTS

| Number | Name | Date |
|---|---|---|
| 1,471,444 | Brassington | Oct. 23, 1923 |
| 1,935,329 | Needham | Nov. 14, 1933 |
| 2,065,628 | Taylor | Dec. 29, 1936 |
| 2,113,060 | Sandberg | Apr. 5, 1938 |
| 2,152,812 | Money | Apr. 4, 1939 |
| 2,301,176 | Elliott | Nov. 10, 1942 |

FOREIGN PATENTS

| Number | Country | Date |
|---|---|---|
| 529,440 | German | 1931 |